United States Patent [19]

Stern

[11] Patent Number: 5,056,274
[45] Date of Patent: Oct. 15, 1991

[54] DEVICE FOR CLEANING VEHICLE WHEELS

[76] Inventor: Leif E. Stern, Fattershus, Lund, Sweden, S-225 90

[21] Appl. No.: 569,762

[22] Filed: Aug. 22, 1990

Related U.S. Application Data

[63] Continuation of Ser. No. 340,552, Apr. 19, 1989, abandoned.

[30] Foreign Application Priority Data

Apr. 22, 1988 [SE] Sweden .............................. 8801493

[51] Int. Cl.$^5$ .............................................. B24C 3/04
[52] U.S. Cl. ........................................ 51/425; 51/420; 51/320
[58] Field of Search ................ 51/424, 425, 320, 321, 51/419, 420, 436; 134/7

[56] References Cited

U.S. PATENT DOCUMENTS

| 270,306 | 1/1883 | Griffin | 51/420 |
| 1,907,411 | 5/1933 | Timoney | 51/425 |
| 2,867,914 | 1/1959 | Tomchak | 34/104 |
| 3,012,262 | 12/1961 | Mori | 51/426 |
| 3,395,412 | 8/1968 | Derwin | 15/3 |
| 4,374,443 | 2/1983 | Mosell | 134/7 |

FOREIGN PATENT DOCUMENTS

| 2325484 | 5/1974 | Fed. Rep. of Germany . |
| 2426415 | 11/1975 | Fed. Rep. of Germany . |
| 3401379 | 7/1985 | Fed. Rep. of Germany . |
| 0028174 | 3/1977 | Japan ..................................... 134/7 |
| WO80/01546 | 8/1980 | PCT Int'l Appl. . |
| WO80/02105 | 10/1980 | PCT Int'l Appl. . |
| 528950 | 11/1972 | Switzerland . |

Primary Examiner—Robert A. Rose
Attorney, Agent, or Firm—Bacon & Thomas

[57] ABSTRACT

The present invention relates to a device for cleaning vehicle wheels. In order to provide a device which permits wet blasting at which a maximum amount of plastic granules always is present in the blasting medium during blasting, while at the same time small slurry forming particles which loosen from the vehicle wheel during blasting are effectively separated from the blasting agent, the device comprises a blasting agent container (4) with a blasting agent (5) consisting of a liquid (54) and of plastic granules (55) floating in the surface area (60) of said liquid, whereby a pump aggregate (21) for distributing blasting agent (5) from the blasting agent container (4) to the vehicle wheel (2) includes an inlet (59) for blasting agent, said inlet being provided to take blasting agent into the pump aggregate (21) from the surface area (60) of the liquid (54) wherein the plastic granules (55) are present, and whereby the blasting agent container (4) has a lower part (6) positioned at such a substantially lower level than the blasting agent inlet (59) that particles (12) blasted off the vehicle wheel (2) and sinking down into said lower part (6) substantially remain in said lower part instead of being sucked into the pump aggregate (21) via the blasting agent inlet (59) thereof.

14 Claims, 7 Drawing Sheets

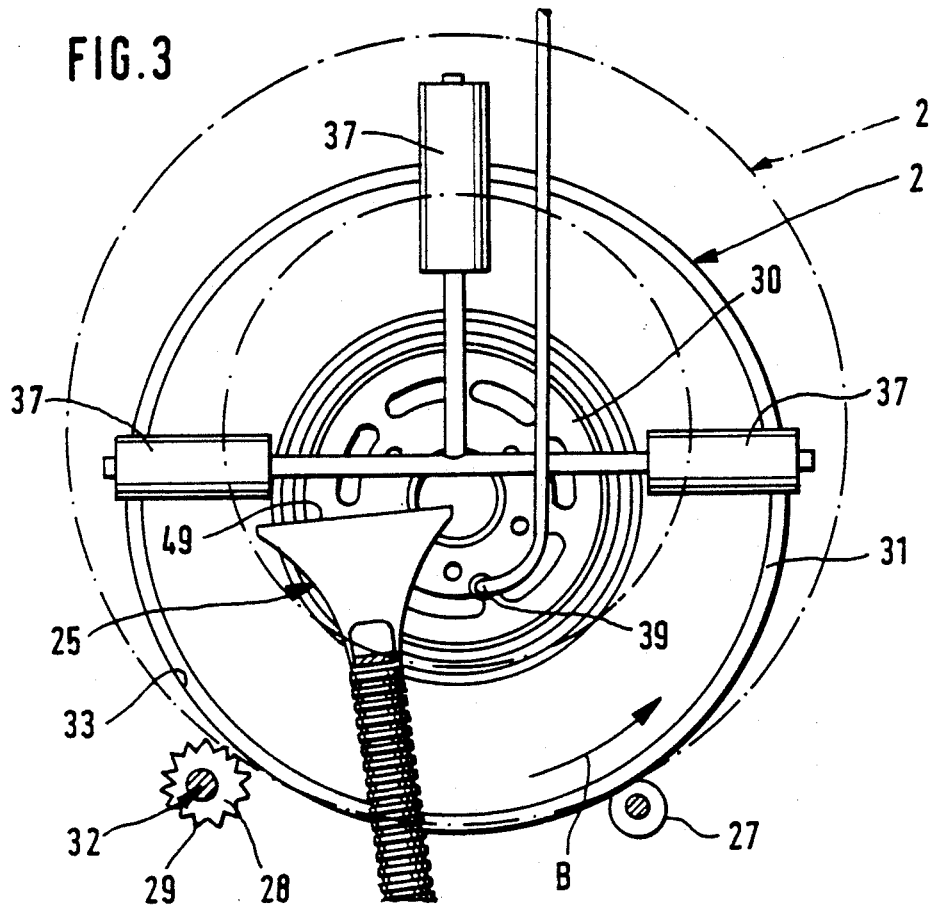
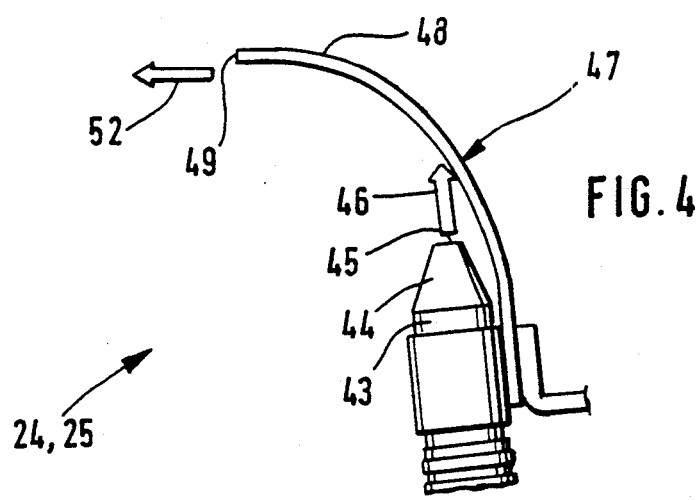

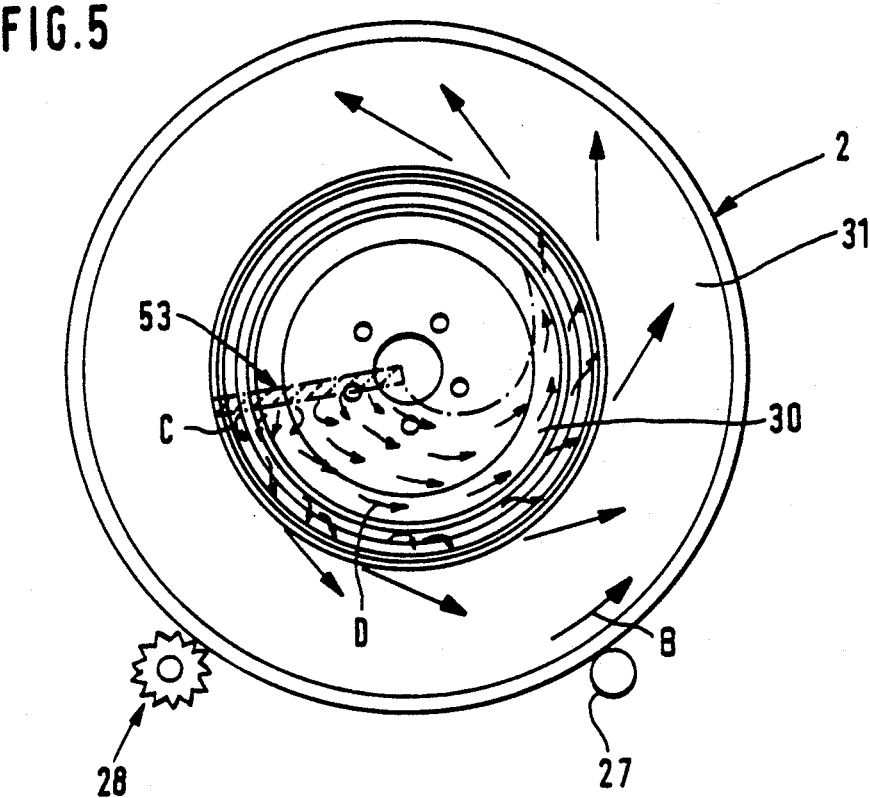
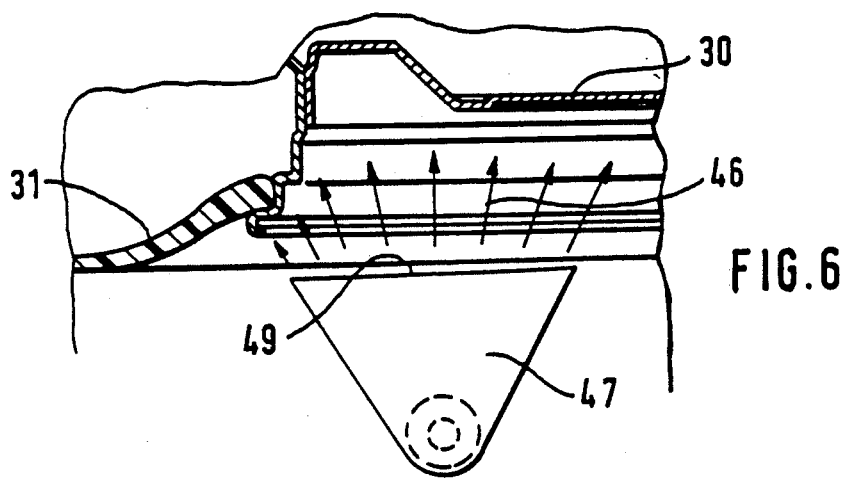

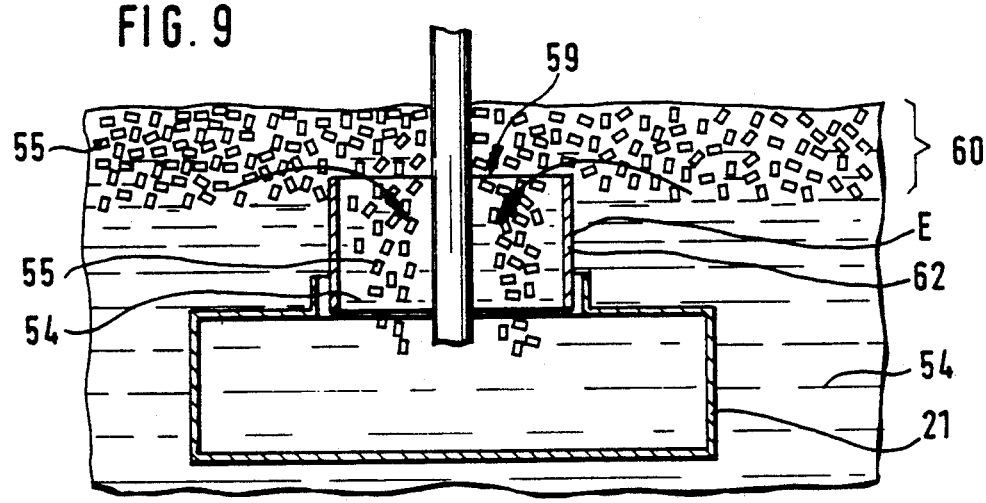
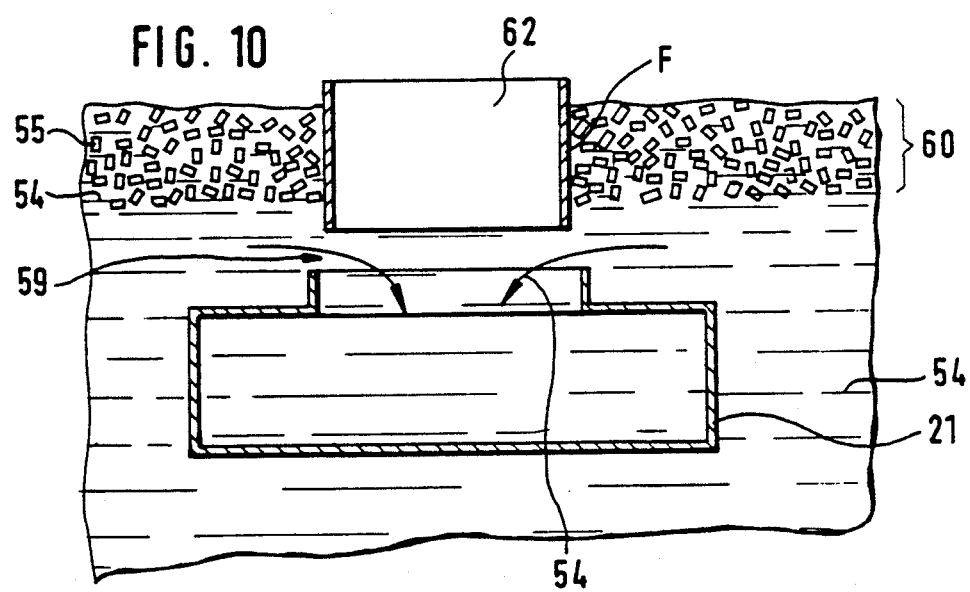

DEVICE FOR CLEANING VEHICLE WHEELS

This application is a continuation of application Ser. No. 07/340,552, filed April, 19, 1989, now abandoned.

The present invention relates to a device for cleaning vehicle wheels.

Devices for cleaning vehicle wheels are already known from DE-B2-23 25 484. The prior art devices have however, a limited flushing effect since cleaning is made only by means of liquid jets. Only liquid is not capable of loosening fixed contaminants.

From PCT/SE80/00094 it is already known a dish washing machine which wash by means of a liquid and granules mixed into said liquid. However, this washing machine and the liquid with granules used therein can not be used for efficient cleaning of vehicle wheels.

The object of the present invention is to provide a device for more efficient cleaning of vehicle wheels than previously possible. According to the invention this is arrived at by means of the characterizing features of claim 1.

The wet blasting device according to the invention allow the blasting agent jets directed towards the vehicle wheel to contain such large amounts of plastic granules that the cleaning effect is as required during the entire cleaning procedure. At the same time, the wet blasting device according to the invention allows larger particles, loosened during blasting of the vehicle wheel, to take part in the blasting as blasting particles together with the plastic granules, while smaller particles which would deteriorate the blasting effect, are prevented from taking part as plasting particles by being removed from the circulation.

The invention will be further described below with reference to the accompanying drawings, in which FIG. 1 is a section through the cleaning device according to the ion;

FIG. 3 is a side view of members forming part of the cleaning device as well as of a vehicle wheel arranged thereat;

FIG. 4 is a plan view of a nozzle forming part of the cleaning device;

FIG. 5 illustrates a vehicle wheel, positioned in the cleaning device during rotation and cleaning, FIG. 6 is a section through the part of a vehicle wheel disposed adjacent a nozzle in the cleaning device;

FIG. 9 illustrates schematically how blasting agent during wet blasting flows into a pump aggregate in the clean device of FIG. 1.

Figure 1:
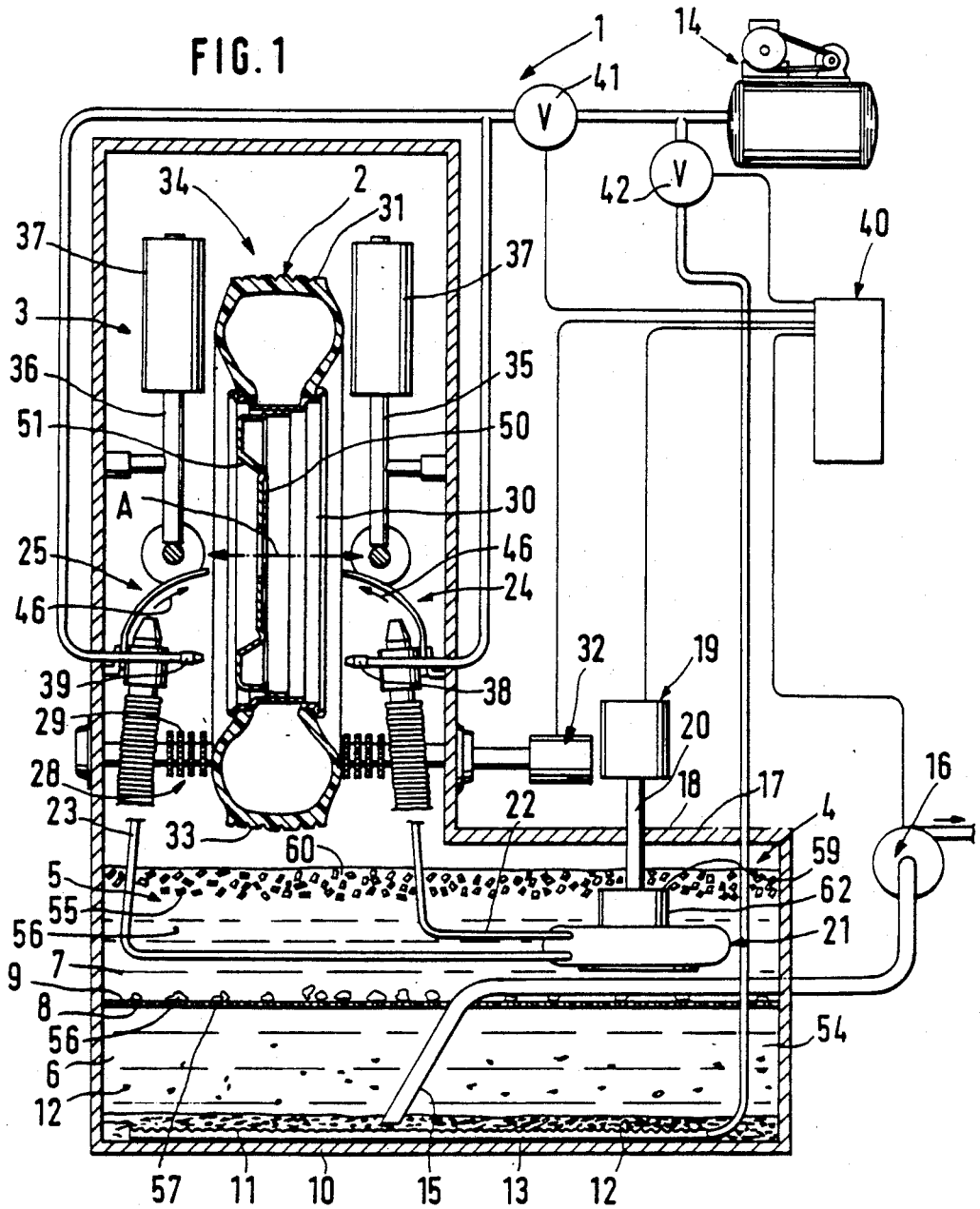
FIG. 1 illustrates schematially how blasting agent after wet blasting flows into the pump aggregate for cleaning the vehicle wheel.
Figure 2:
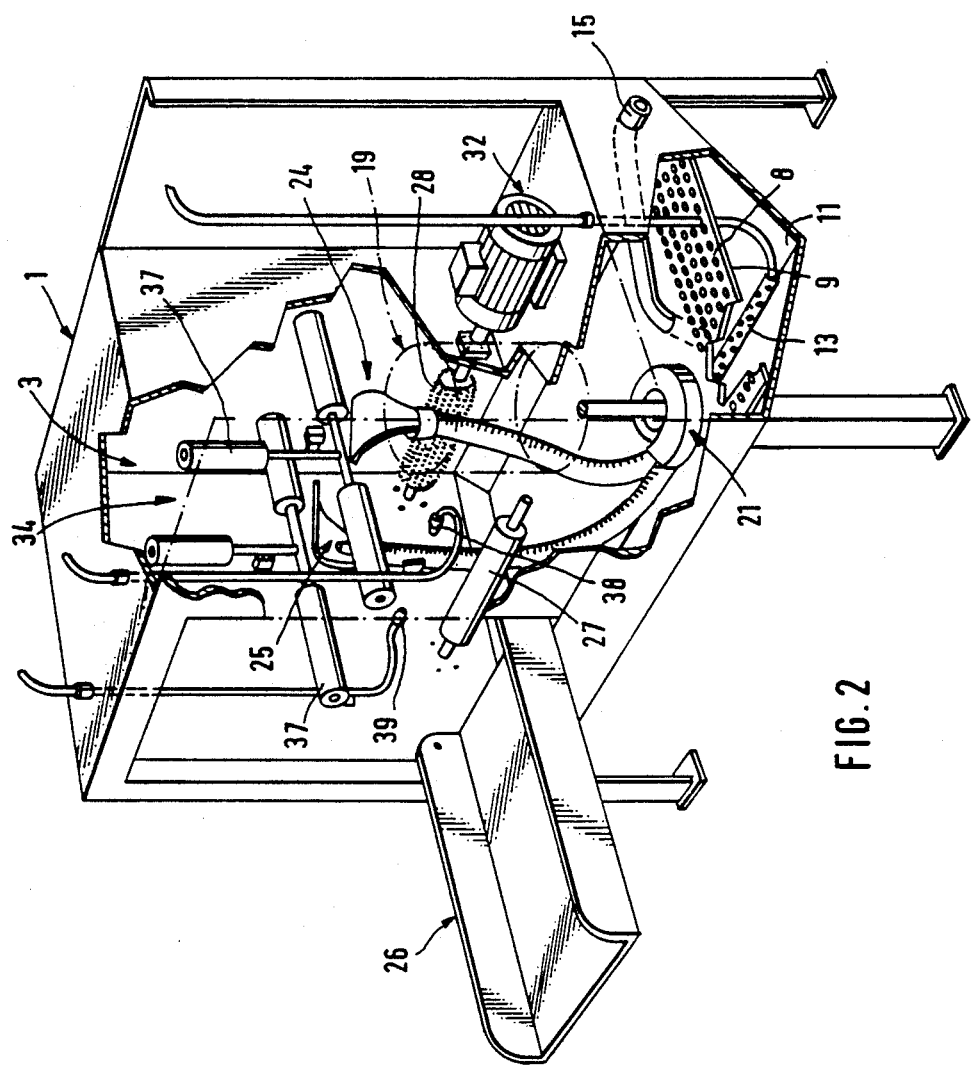
FIG. 2 is a perspective view of the cleaning device of FIG. 1.

The drawings illustrate a wet blasting device 1 for cleaning vehicle wheels 2. The wet blasting device 1 has a wet blasting chamber 3 and beneath said chamber a blasting agent container 4 for collecting blasting agent 5. The blasting agent container 4 is divided into a lower part 6 and an upper part 7 by a screen means 8 having apertures 9 of a certain size, e.g. round apertures with a diameter of 3 mm. The blasting agent container 4 has e.g. a V-shaped bottom 10 (see FIG. 2) for providing a flute 11 down below for collecting particles 12 which are sufficiently small to sink through the apertures 9 in said screen means 8. In the flute 11 there is e.g. an apertured hose 13 which is connected to a compressed-air aggregate 14. By letting in pressurized air through the hose 13 in the flute 11, the contaminants therein are whirled about, which means that they easily can be sucked out through a conduit 15 leading to a pump 16.

The blasting container 4 is partially disposed beneath the wet blasting chamber 3 but it also has a side member 17 which is disposed beside said chamber 3. On the upper side 18 of the side member 17 there is provided an electric motor 19, the drive shaft 20 of which extends down into the upper part 7 of the blasting agent container 4 and operates a pump aggregate 21 submerged into the blasting agent and positioned in said upper part 7. This pump aggregate 21 has an inlet 59 for blasting agent 5 and includes two hoses 22 and 23 through which blasting agent 5 is pumped to two blasting nozzles 24 and 25 in the wet blasting chamber 3.

One wall to the wet blasting chamber 3 has a hatch 26 which can be opened and the lower portions of which are pivotally mounted such that the hatch may be swung about a horizontal pivot axle from an upright position in which it closes the chamber 3 to a horizontal position (see FIG. 2) wherein it opens the chamber 3 and provides a roller way for the vehicle wheel 2.

Within the hatch 26 and adjacent thereto there is provided a transverse support roll 27 for the vehicle wheel 2 and farther into the wet blasting chamber 3 there is provided a transverse driving means 28 which is adapted to rotate the vehicle wheel 2 relative to the blasting nozzles 24, 25, The driving means 28 comprises a roll with radially outwardly directed teeth, points or other gripping portions 29 which may rotate the wheel 2 after positioning thereof with rim 30 and tire 31 in the wet blasting chamber 3. The driving means 28 is rotated by an electric motor 32 disposed outside the wet blasting chamber 3 and in turn, said driving means 28 rotates the wheel 2 while the gripping portions 29 engage the tread surface 33 of the tire 31 and eventually extend into the tread design depth thereof. The weight of the vehicle wheel 2 and the friction of the tire rubber are thus sufficient to ensure a safe rotation of the wheel 2.

On both sides of a space 34 in the wet blasting chamber 3 for the vehicle wheel 2 there are provided supports 35, 36 with three rolls 37 each in order to ensure that the wheel 2 remains standing upright in said space 34 before it is rotated.

In the wet blasting chamber 3 there are also provided two compressed-air nozzles 38 and 39 which, as the blasting nozzles 24, 25, are positioned on opposite sides of the space 34 for the wheel 2. The compressed-air nozzles 38, 39 are connected to the compressed-air aggregate 14.

The wet blasting device 1 also comprises a control unit 40 adapted to control the operation of the compressed-air aggregate 14, the pump 16, the electric motor 19 to the pump aggregate 21 and the electric motor 32. The control unit 40 also controls two valves 41 and 42, of which the valve 41 opens and closes the flow of compressed air between the compressed-air aggregate 14 and the blasting nozzles 24, 25, and the valve 42 between said aggregate 14 and the hose 13 The control unit has an automatically operating program unit which controls the time and order of the various functions.

Each blasting nozzle 24, 25 consists of a tube 43 with a conically tapering end portion 44 and a circular end opening 45 for discharging jets 46 of blasting agent towards a curved guide means 47, e.g. a guide plate (see FIG. 4). The guide means 47 is turned inwards towards the space 34 and its free end portion 48 is directed substantially parallel with the axle direction A of a vehicle wheel 2 standing in the space 34. The guide means 47 has a planar end edge 49, the length of which substantially corresponds with half the diameter of the rim 30. Furthermore, said guide means 47 is positioned relative to the space 34 such that the end edge 49, seen from the side, will extend essentially along half the rim 30, extend perpendicular to the direction of rotation B of the vehicle wheel 2 and extend radially relative to said rim 30 (see FIG. 3).

With this embodiment of the blasting nozzles 24, 25, said nozzles may be brought to simultaneously direct jets 46 of blasting agent towards opposite sides 50, 51 of the rim 30. Thereby, the guide means 47 for each blasting nozzle 24, 25 provides jets 46 of blasting agent directed towards the vehicle wheel 2 substantially parallel with the axle direction A and said jets 46 of blasting agent are formed to a planar jet 52 striking substantially half the side 50, 51 of the rim and which is essentially transverse to the direction of rotation B of the wheel 2. As is apparent from FIG. 5, the planar jet 52 strikes the side of the rim within a narrow area 53 between the center of the rim and the outer edge thereof.

The jets 46 of blasting agent are preferably discharged by the blasting nozzles 24, 25 with a pressure of substantially three bars, but said pressure may be altered whenever required. During wet blasting, the vehicle wheel 2 is rotated at a speed of 80-200 rpm, but said speed may be altered whenever required.

The blasting agent 5 consists of a liquid 54 and plastic granules 55 with a lower density than the liquid such that said granules float on the surface 60 of the liquid 54. The liquid 54 may be water and the plastic granules 55 may be made of e.g. polyolefine with a lower density than water. The particle size of the granules 55 may vary between 1-10 mm; in the present example the granules have a size of about 4 mm, i.e. they are somewhat larger than the apertures 9 in the screen means 8, which means that they can not penetrate into the lower part 6 of the blasting agent container 4. In the present example, the plastic granules 55 are somewhat elastic and substantially cylindrical, whereby their diameter is about 4 mm, while they are somewhat longer. However, it is possible to use plastic granules of another shape and of inelastic type. The water in the blasting agent 5 may be replaced by a mixture of water and another liquid or another liquid than water.

For cleaning a vehicle wheel 2, the hatch 26 is opened and the wheel is put thereon and rolled into the space 34.

When you thereafter release the vehicle wheel 2, it will engage one or some of the rolls 37, which means that it will remain standing with the tire 31 engaging the support roll 27 and drive means 28. Thereafter, the hatch 26 is closed and operation started by means of the control unit 40, which means that the electric motors 19 and 32 are started. Hereby, the drive means 28 starts to rotate and thus, the vehicle wheel 2 rotates relative to the blasting nozzles 24, 25 while at the same time wet blasting is commenced by the pump aggregate 21 and the blasting nozzles 24, 25 generating jets 46 of blasting agent which strike substantially the rim 30, and thereafter, the blasting agent 5 and loosened contaminants 56 and 57, e.g. mineral particles, flow downwards and back to the blasting agent container 4. After striking the sides 50, 51 of the rim, the blasting agent 5 whirls and flow along the tire 31 such that said tire is also cleaned.

Figure 7:
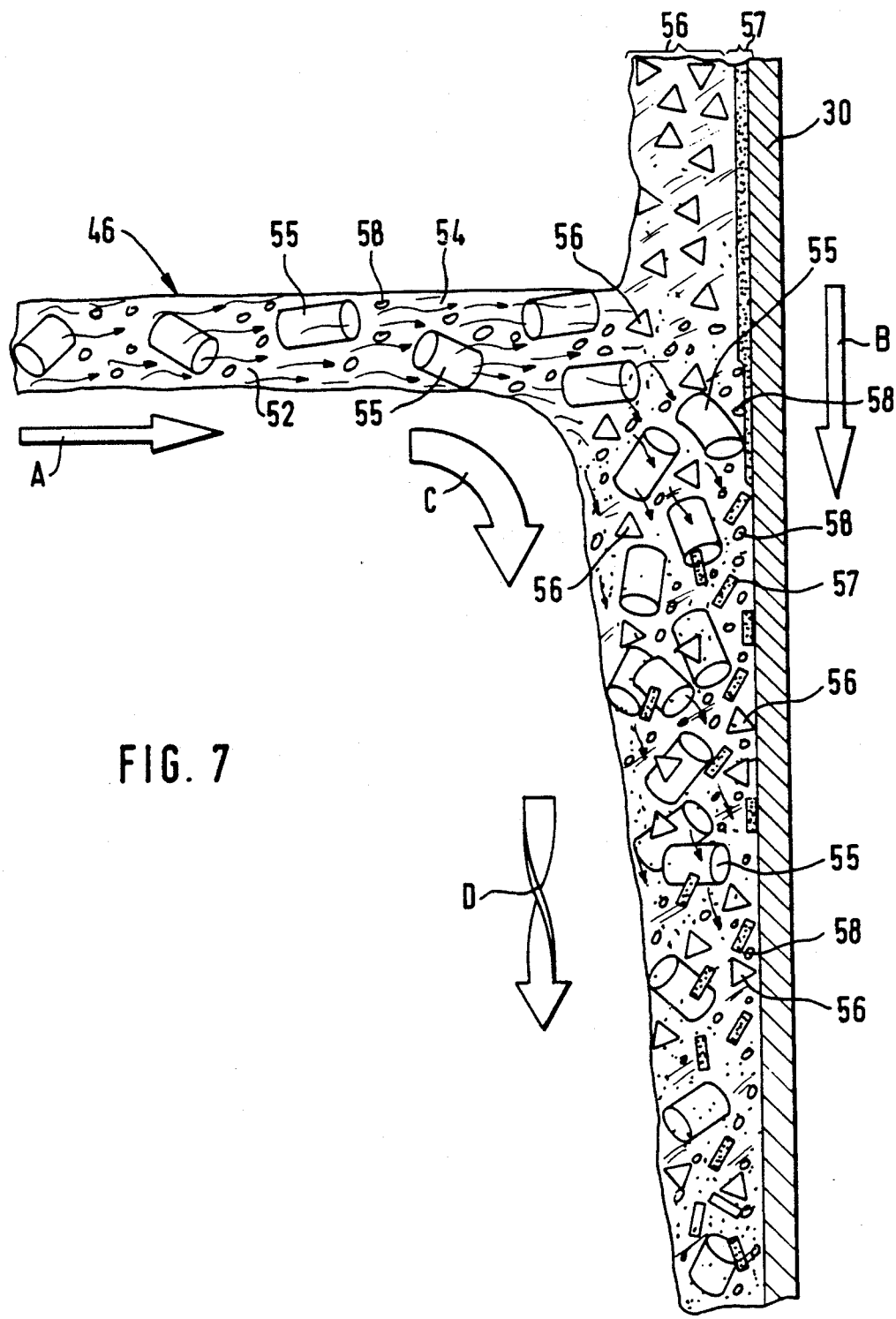
FIG. 7 illustrates schematically the cleaning of contaminants from the vehicle wheel.

FIG. 7 schematically and in detail illustrates what is happening when a jet 46 of blasting agent strikes the contaminants on the rim 30 while the wheel 2 is rotating. Thus, the blasting agent 5 is deflected to the side (arrow C) by the rotation of the wheel 2, which means that the jet with plastic granules 55 does not rebound and counteract subsequent portions of the jet and the plastic granules 55 therein. Instead, the blasting agent 5 will be subjected to centrifugal forces by the rotation of the wheel and it will flow in the peripheral direction of the rim (arrow D, FIGS. 5 and 7) and thereby pass e.g. along all nooks in the rim 30.

Since the plastic granules 55 in the blasting agent 5 hit the outer, loose contaminants 56 on the rim 30, said contaminants will be rotated (see FIGS. 5 and 7) which means that they get a very effective "digging action". When the thus rotating plastic granules 55 reach the hard, on the rim 30 strongly fixed contaminants 57, they will press small mineral particles 58 in front thereof towards the contaminants 57 such that these are effectively "scrubbed off".

This wet blasting method is thus a coarse cleaning and simultaneously a finer scrubbing of the rim 30, which means that common water may be used, which need not be heated nor provided with cleaning chemicals.

When wet blasting has gone on for a predetermined time, the control unit 40 deactivates the motor 19 to the pump aggregate 21, while the motor 32 continues to rotate the drive means 28 and thus, the vehicle wheel 2. This means that the wheel 2 is rotated after the blasting has ceased, whereby said wheel 2, by means of the centrifugal force generated by the rotation, will throw away the plastic granules 55 and other components in the blasting agent 5 and eventual remaining loose contaminants. Thereafter, the wheel 2 may be removed in clean condition and without remaining plastic granules 55, etc..

In connection with its rotation after wet blasting, the vehicle wheel 2 may be blown dry by compressed air. This is arrived at by operating the valve 41 to open so that compressed air may flow to and out of the nozzles 38, 39.

When required, the particles 12 may be sucked out of the collecting container 4. In order to facilitate this, the valve 42 is opened such that compressed air can flow to the hose 13 and out through its openings. Hereby, particles 12 are whirled about and easily sucked out through the conduit 15 by means of the pump 16.

To ensure that the blasting agent 5 discharged through the blasting nozzles 24, 25 includes an optimal amount of plastic granules, the blasting agent inlet 59 of the pump aggregate 21 is arranged such that is takes up blasting agent 5 from such a surface area 60 of the liquid 54 wherein the plastic granules 55 float around. Since substantially all plastic granules 55 float and occupy this surface area 60, there is no risk that the pump aggregate 21 only sucks liquid or liquid with too small a content of plastic granules 55.

In order to further ensure that smaller particles 12, loosened from the vehicle wheel 2 and forming a slurry-like substance, are not recirculated from the blasting agent container 4 to the wheel 2, the lower part 6 of said container 4 is situated at such a substantially lower level than the inlet 59 for blasting agent that the smaller particles 12, falling to said lower part 6 remain in said lower part instead of being sucked into the pump aggregate 21 via said inlet 59. While these smaller particles 12 which form a slurry are collected in the lower part 6 of the blasting agent container 4, it is ensured that any slurry-like substance is not returned to the wet blasting chamber 3 and the vehicle wheel 2, which is essential since this slurry otherwise "foul" the wheel 2 and counteracts the blasting effect.

The screen means 8 dividing the blasting agent container 4 into the lower part 6 and the upper part 7 extends horizontally or substantially horizontally and it is so disposed in the blasting agent container 4 that the surface area 60 of the liquid 54 with the plastic granules 55 and the blasting agent inlet 59 of the pump aggregate 21 are positioned substantially above the screen means 8, while the flute 11 or another collecting area for collecting the smaller particles 12 sinking down to the lower part 6 via the screen means 8 is positioned substantially beneath said screen means 8. The screen means 8 ensures that neither the plastic granules 55 nor larger particles 56 and/or 57 which have been blasted off the vehicle wheel 2 can sink down into the lower part 6. Instead, neither the plastic granules 55 nor the larger particles 56 and/or 57 will ever be found at a lower level in the blasting agent container 4 than that they can be sucked into the pump aggregate 21 for recirculation to the wet blasting chamber 3. Furthermore, the screen means 8 separates the lower part 6 from the upper part 7 so efficiently that substantial turbulence in the liquid 54 in the lower part 6 is prevented, whereby small particles 12 can settle slowly downwards to the collecting area 11 and remain there without whirling also when the pump aggregate 21 is operating and create substantial turbulence in the liquid 54 in the upper part 7.

The blasting agent inlet 59 of the pump aggregate 21 is preferably provided in or very close to that surface area 60 of the liquid 54 wherein the plastic granules 55 are floating. Said inlet 59 may preferably have an upwardly open inlet opening 61 defined by an upper opening in an annular flange 62, which is mounted directed upwards on top of a pump housing 63 of the pump aggregate 21.

Figure 8:
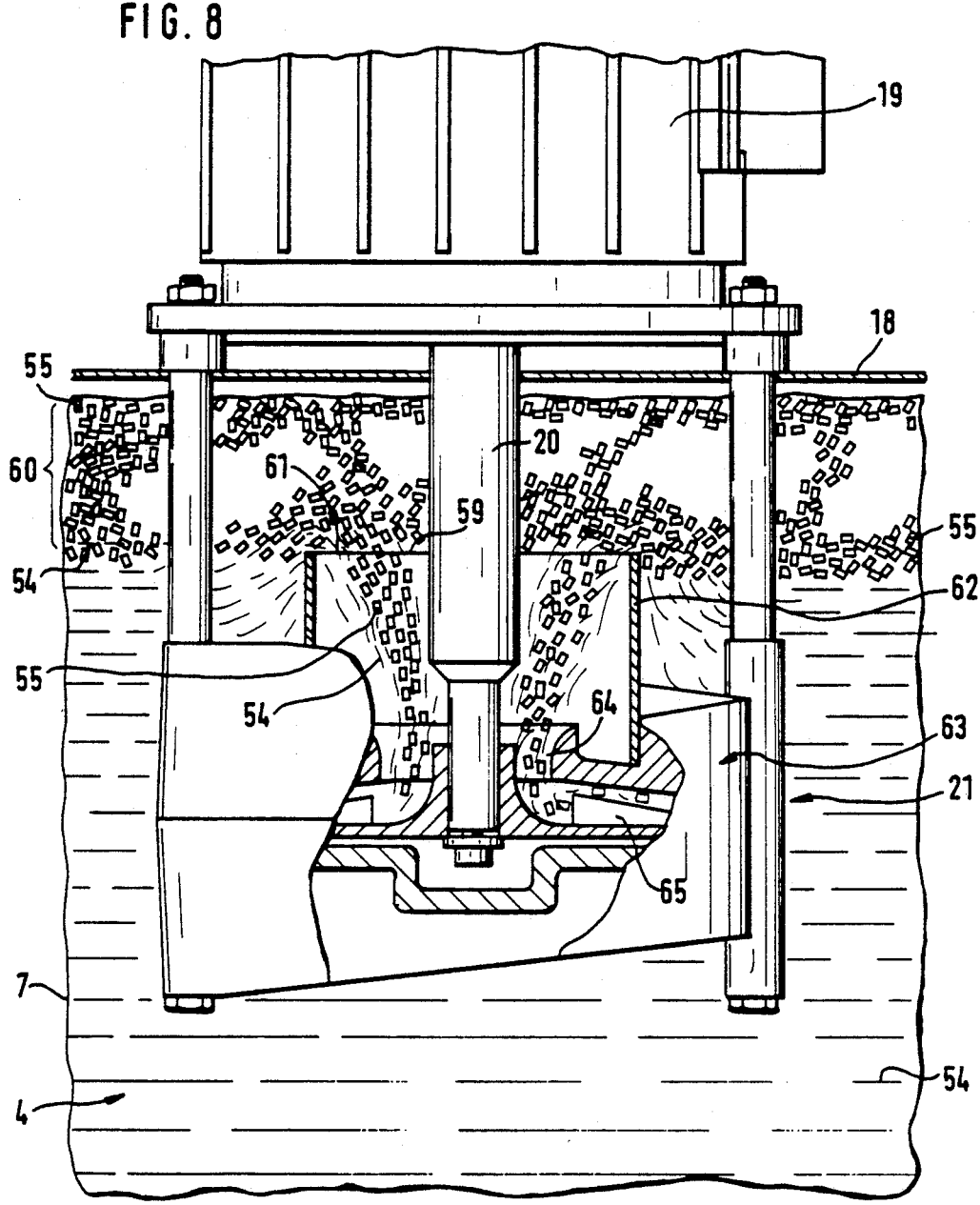
FIG. 8 illustrates a part of cleaning device of FIG. 1.

As is apparent from FIG. 8, the pump housing 63 has apertures 64 on top within the annular collar or flange 62. The pump aggregate 21 will suck in the liquid/plastic granules-mixture present in the surface area 60 via the interior of the collar 62 and the apertures 64.

FIG. 8 also shows the blade wheel 65 of the pump aggregate, said blade wheel being mounted in the pump housing 63 and fixed at the drive shaft 20 of the electric motor 19.

As is apparent from FIGS. 9 and 10, the inlet 59 for blasting agent may include a movable member, e.g. an annular collar 62 which is settable in a position (e.g. position E in FIG. 9) wherein it permits intake of liquid 54 with plastic granules from the surface area 60 of said liquid to the pump aggregate 21, whereby the movable member is displaceable to another position (e.g. position F in FIG. 10) wherein it does not permit intake of liquid with plastic granules from said surface area 60 of said liquid 54 to the pump aggregate 21, but instead substantially liquid 54 free from granules from an area of the blasting agent container 4 beneath the surface area 60 with plastic granules.

In the structure of FIGS. 9 and 10, the collar 62 has simply been moved from a lower position E wherein it takes in liquid 54 with plastic granules from the surface area 60, to a higher position F wherein it obstructs the supply from said surface area 60 but opens the supply for liquid substantially free of plastic granules from a level beneath said surface area 60 to the pump aggregate 21. By moving the collar from position E to position F when the blasting operation is finished, flushing of the vehicle wheel 2 is obtained by simple means (e.g. for removal of plastic granules 55 remaining thereon) with liquid free of plastic granules.

For permitting this displacement of the collar 62, said collar is journalled on guides (not shown), and its displacement may be time controlled and carried out by means not shown.

The movable member may of course be designed in another way than a collar and it may be rotatable instead of displaceable in order to thereby open and close side inlets.

By means of the device described above, it is achieved that the liquid 54 is carrier substance for plastic granules 55. These granules are present in a sufficient amount in the jets of blasting agent, which also include larger particles 56, 57 of such material that is blasted off the vehicle wheel, while smaller particles 12 which interfere with the operation are removed in a simple and efficient manner. While the plastic granules 55 distribute uniformly in the surface area 60, they also cover the blasting agent inlet 59 and thereby prevent the pump aggregate 21 from sucking in air.

The invention is not limited to the embodiment described above, but may vary within the scope of the following claims. Thus, it could be mentioned that the screen means 8 eventually may be deleted or have another shape than illustrated and the blasting agent inlet 59 may be designed and arranged otherwise. Furthermore, rotation of the vehicle wheel 2 might not be required; the jets 46 of blasting agent can be directed towards the entire side or sides of the vehicle wheel instead of only towards the rim 30, only one side of the wheel 2 or rim 30 at the time may be flushed; the jets 46 of blasting agent may be directed in another way than shown and described; certain contaminants may be separated otherwise than described, e.g. by filter means. The number of blasting nozzles may be one or more and they can be designed and/or directed otherwise than described and they can eventually be movable relative to the vehicle wheel for changing position during blasting. The blasting agent may comprise other ingredients than those mentioned and one may e.g. add other particles except the plastic granules and these other particles may also consists of plastic or minerals; the water in the blasting agent may be mixed with another liquid and the plastic may have another shape than shown and described. Eventually, in certain cases, the water can be heated and/or mixed with cleaning compounds. Finally, it should be mentioned that it is also possible to design the wet blasting device for wet blasting more than one vehicle wheel simultaneously.

I claim:

1. A device for cleaning contaminants from vehicle wheels, comprising:
   (a) a container for containing a blasting agent including a liquid and plastic granules having a lower density than the liquid such that said plastic granules float in a surface area in said liquid;
   (b) the container having a lower part and an upper part for the liquid, the upper part being adapted to contain the plastic granules floating in the surface area of the liquid and the lower part being adapted to collect contaminants removed from the vehicle wheels beneath said surface area;

(c) a pump for distributing the blasting agent from the container to a vehicle wheel, the pump including an inlet positioned in the upper part of the container for sucking plastic granules from the surface area of the liquid into the pump; and (d) nozzle means communicating with the outlet of the pump for receiving the blasting agent therefrom and blasting the agent towards the vehicle wheel to remove the contaminants therefrom.

2. The device of claim 1, wherein the pump inlet is positioned in the lower part of the container surface area.

3. The device of claim 1, wherein the pump inlet is positioned somewhat beneath the surface area.

4. The device of claim 1, wherein the pump inlet is positioned at a substantial distance above a lower portion of the lower part of the container at which the contaminants are collected.

5. The device of claim 1, wherein the pump inlet includes an upwardly directed inlet opening positioned adjacent the surface area of the blasting agent contained within the container for receiving the liquid and plastic granules of the agent.

6. The device of claim 5, wherein the pump further includes a housing, an annular collar extending upwardly from the housing, and the inlet opening of the pump being defined by an upper portion of the annular collar.

7. The device of claim 1, wherein the pump inlet includes a member movable between a first position permitting the intake of liquid and plastic granules, and a second position, permitting the intake of substantially only liquid, the movable member being positioned adjacent the surface of the agent contained within the container.

8. The device of claim 1, further including:
(a) a wet blasting chamber for containing the vehicle wheel;
(b) the nozzle means including a pair of spaced nozzles for receiving the vehicle wheel therebetween;
(c) drive means for rotating the vehicle wheel relative to the nozzles; and
(d) each nozzle including a tube having a tapered end portion terminating in a circular end opening for discharging a jet of blasting agent therefrom, a curved guide means for receiving the jet of blasting agent and directing same towards the vehicle wheel, the nozzle and guide means being positioned to direct the jet of blasting agent against an area of the wheel extending substantially radially across half the diameter of the rim.

9. The device of claim 1, further including:
(a) drive means for rotating the vehicle wheel; and
(b) means for blowing compressed air against the wheel for drying same.

10. The device of claim 1, further including drive means for rotating the vehicle wheel at a speed of approximately 80-200 rpm and the nozzle means including means for blasting the agent at a pressure of approximately 3 bars.

11. The device of claim 1, wherein the plastic granules are formed of polyolefine and have an particle size of between about 1-10 mm.

12. The device of claim 1, wherein the plastic granules are elastic and have a particle size of approximately 4 mm.

13. The device of claim 1, wherein the liquid is water.

14. The device of claim 1, wherein the liquid has the same temperature as the surroundings.

* * * * *